H. P. HINZ.
POTATO DIGGER.

No. 81,636.  Patented Sept. 1, 1868.

Witnesses:
W. E. Maus
A. B. Parsons

Inventor:
Henry P. Hinz

H. P. HINZ.
POTATO DIGGER.
No. 81,636. Patented Sept. 1, 1868.
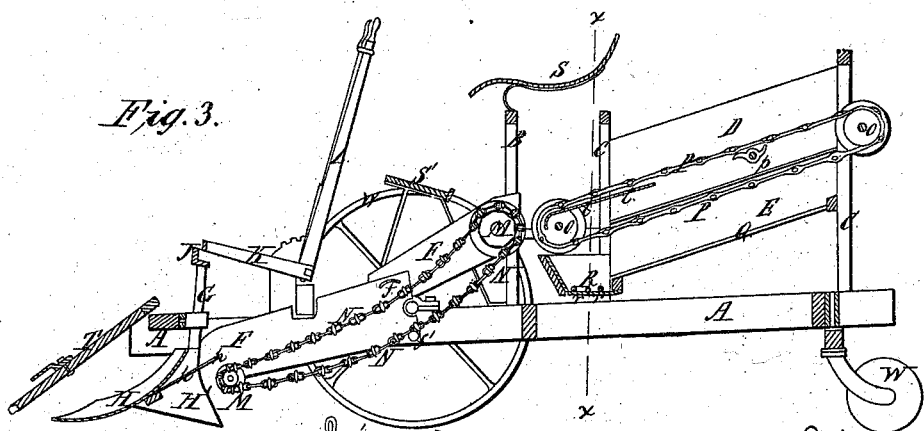
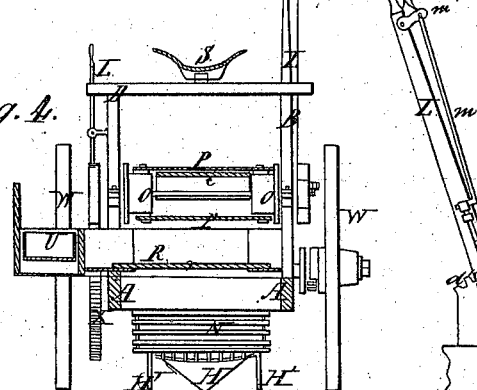
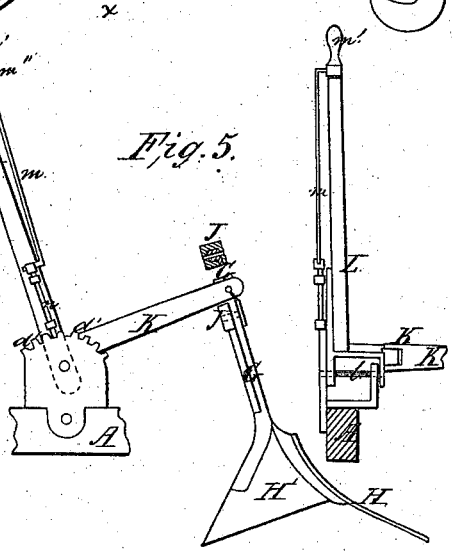
Witnesses:
W. E. Mans.
A. B. Parson
Inventor:
Henry P. Hinz

United States Patent Office.

HENRY P. HINZ, OF DUNTON, ILLINOIS.

*Letters Patent No. 81,636, dated September 1, 1868.*

IMPROVEMENT IN POTATO-DIGGERS.

*The Schedule referred to in these Letters Patent and making part of the same.*

TO ALL WHOM IT MAY CONCERN:

Be it known that I, HENRY P. HINZ, of Dunton, in the county of Cook, and State of Illinois, have invented a new and useful Improvement in Potato-Digging Machines; and I do hereby declare and make known that the following is a full, clear, and exact description of the same, reference being had to the accompanying drawings, and the letters and figures marked thereon, which form part of this specification.

My said invention consists in a machine to be drawn upon wheels by horses along the rows of potatoes, which digs the potatoes from the ground, separates them from the soil and from the vines, and conveys them through an elevator into bags, as the machine moves along over the ground, the entire operation being performed automatically, as hereinafter more fully described.

To enable those skilled in the art to understand how to construct and use my said improvement, I will describe the same with particularity, making reference in so doing to the aforesaid drawings, in which—

Figure 3 is a longitudinal vertical sectional view, taken at the centre,

Figure 4 is a vertical cross-section, taken at the line $x$, fig. 3, looking to the front, and Figure 5 represents a side and front view of the digger or shovel, and the means of raising and lowering the same.

Similar letters of reference in the several figures denote the same parts of my invention.

A represents a suitable frame, supported upon two main wheels W W', and two small rear wheels, attached to the frame by a rotating vertical standard, so as to turn freely in any direction, to facilitate the turning around of the machine.

The machine is intended to be of such width that the wheels will strike the row of potato-hills to be dug or harvested, the wheels running in the hollows between rows.

Figure 1:
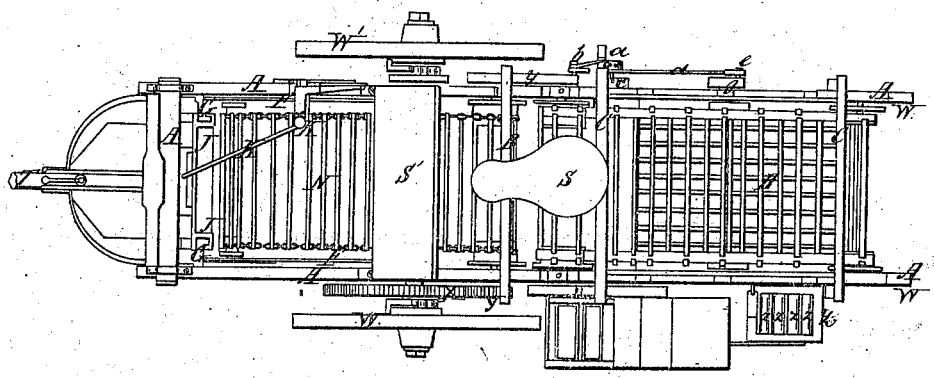
Figure 1 represents a plan or top view of my invention.
Figure 2:
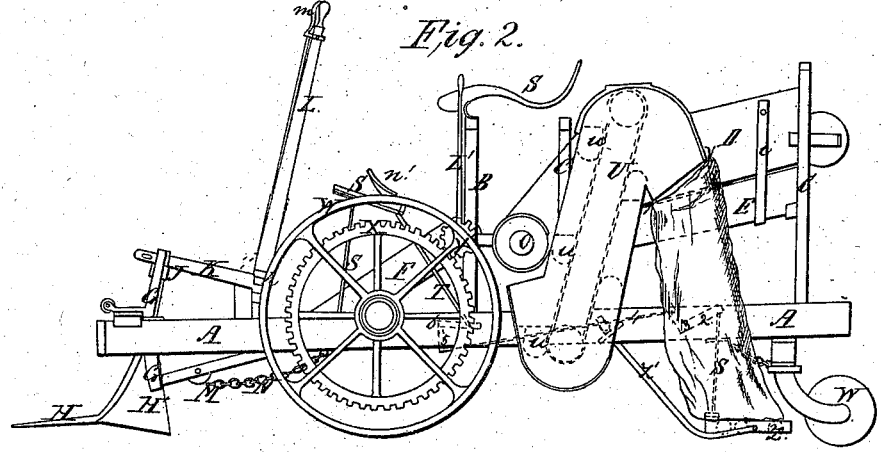
Figure 2 is a side elevation of the same.

B represents an upright frame, erected upon the main frame A, upon which a seat, S, is arranged for the driver, a foot-rest, S', being also suitably arranged upon supporting-standards $s'$ $s'$, as seen in fig. 2.

Upon said frame B are also secured the rear ends of two jointed frames F F, arranged upon each side of the front half or portion of the machine, as clearly seen in fig. 3, the front ends of said frames F F being secured to the curved or vertical arms G G, which are secured upon each side of the digger or scoop H, as shown, said digger having side runners or supports, marked H'.

The said arms G G pass up through suitable ways or slides in or upon a cross-bar, I, and are provided at the top with a suitable removable cross-bar, J, fastened thereupon by means of screws.

Upon the guide-bar I there is a series of ways or vertical grooves, in which the arms G G may have a vertical movement, when arranged therein, by removing the cross-arm J, and withdrawing said arms from one set of ways and inserting them in another set, which provision is to enable the digger or shovel to have an adjustment towards or from either side of the machine, if required.

To the said cross-bar J an arm, K, is attached, which arm K is provided with a hinge at $k$, to permit the aforesaid lateral adjustment of the shovel H, and is also connected rigidly, so far as vertical play is concerned, to a lever, L, whose upper end lies within reach of the driver's hand, so that the driver, by drawing back the lever, can raise the shovel and the front end of the frame F F, and, by pressing it forward, can lower the said parts, the joint shown at $f f'$, in fig. 3, permitting such motion in said frames F.

The joints $f f'$ are formed by fixing a pin to the upper plate F, and having the same project through a curved slot in the upper end of the lower part of the frame, so said lower part, when its front end is raised or lowered, moves freely upon or about said pins.

In order that the said lever L may be moved as aforesaid, however, the operator must press the handle $m'$ up close to the handle of the lever, the effect of which is to draw up the end of the arm $m''$ and the rod $m$, and so withdraw the latch $n$ from the ratchet-arc $d'$, when the lever L may be moved, as desired, to raise or lower the shovel, and, when adjusted at the desired height, by simply releasing the handle m', a spring, o, throws the latch n back into the ratchet, securely locking the digger at the elevation required.

At the front and rear of the frames F F, are the rollers M, around which passes an endless apron or conveyer, composed of transverse slats, as shown, placed near enough together to prevent the potatoes from falling through, after being thrown back thereupon from the shovel H, passing over a barred bridge, h, which is connected with the heel of the shovel, and projects back to the conveyer N, as shown.

Upon a second upright frame, C C D, at the rear end, is a roller, O', and at or near the front end of said frame, and just at the rear of the upper end of the conveyer N, is another roller, O, around which passes another conveyer, P, composed of slats, which permits the potatoes, and such portions of the soil as may adhere thereto or remain in lumps, to fall through upon a screen, Q, the vines, in the mean time, passing along upon said conveyer, to be passed out or discharged at the rear of the machine.

The potatoes are caught upon the screen Q, through which all the soil or earth drops upon the ground, while the potatoes pass down the screen into a cross-chute, R, the said screen and the bottom of the chute being formed of parallel bars, lying in the direction in which the potatoes are to be conveyed, and from the said chute the potatoes are delivered into an elevator, U, whose buckets, u, carry them up and deliver them into the mouth of a sack, as shown in fig. 2.

The said sack or bag sets or rests upon a platform, z, which may or may not be provided with a series, one or more, of rollers, to facilitate the sliding off of the sack, when full, by the tipping up of said platform by means of the system of rods and levers indicated by the dotted lines in fig. 2, which connect with a foot-lever, n', upon the foot-board S'.

The rod 1 is connected at one end to the said platform Z, and at the other to an angle-lever, 2, pivoted to the frame of the machine at 3, and at the other end of said angle-lever a rod, 4, is attached, running to another angle-lever, 5, pivoted to the frame at 6, the opposite end of said lever 5 being secured to a rod, 7, connected with the foot-piece n', so that, by pressing upon the piece n', it pushes the rod 7 down, and thus, by means of the aforesaid arrangement, raises the front edge of the platform z for the purpose specified, and, while removing the pressure upon n', permits said platform to resume its original position.

Having described the general plan of my said invention, I will describe the means by which the required movements are imparted to the various parts of the machine.

W represents the drive-wheel, which is provided with a gear-wheel, X, in such a manner connected therewith that the gear-wheel revolves with the drive-wheel, when the machine moves forward, but remains stationary when the drive-wheel revolves, as the machine is backed, or whenever the drive-wheel revolves in the reverse direction, the other main wheel being so constructed as to keep the machine in operation while being turned around on the side where the wheel X is situated. The said gear-wheel X engages with a spur-wheel, Y, upon the end of the shaft, which carries the rear roller M, and thereby communicates motion to the conveyer N, and to the other parts of the machine, as hereinafter specified.

The spur-wheel Y is arranged upon its shaft in such a manner as to have a sliding movement upon the same, its revolution causing the shaft to revolve when in one position, but said spur revolving freely upon said shaft when in the other position.

The motion required to throw the spur-wheel Y in and out of gear, is communicated thereto by means of a lever, E', arranged in reach of the driver, said lever being held in the required position by means of a suitable catch.

Upon the opposite end of the said rear shaft M from that upon which the pinion Y is arranged is a drum, and upon the corresponding end of the shaft O is a similar drum, and a band or its equivalent, y, passing around said drums, communicates the desired movement to the conveyer P.

Near the circumference of the drum upon the shaft O is a pin, b, which is connected by a rod to a bent lever, a, the opposite end of said bent lever being connected by a rod, c, to the frame of the screen Q, so that the revolution of said drum also communicates a vibratory or shaking movement to said screen, its frame E being suspended from the frame D by means of suitable elastic or movable hangers i, as seen in fig. 2. The object of said vibratory motion of the screen Q and chute R is to detach all the dirt from the potatoes, and cause them to pass down said screen and chute into the elevator.

There is also connected with the aforesaid pin b, a pitman or rod, d, whose opposite end is attached or connected to a pin, e, arranged eccentrically upon a shaft, g, so that the revolution of the drum to which the pin b is attached causes the revolution of the shaft g.

Upon said shaft g, and just beneath the conveyer P, as clearly seen in fig. 3, is fixed a beater, p, which continually knocks and jars the said conveyer, so as to detach the potatoes from the vines, as the vines pass along to the rear of the machine.

Upon the opposite end of the shaft O is a drum, as shown, around which and a drum upon the upper shaft of the elevator, a belt passes, whereby motion is communicated to the conveyer of the elevator, which delivers the potatoes into the sack, as described, which may be secured upon the discharge-end of the elevator by means of hooks or other suitable devices.

In fig. 3 is shown a close apron, lying under that part of the conveyer P immediately over the chute R, to prevent any dirt from falling through into the chute.

Having described the nature, construction, and operation of my invention, I will now specify what I claim, and desire to secure by Letters Patent:

1. I claim the combination of the shovel H, the conveyers N and P, and the screen Q, arranged to operate substantially as and for the purposes set forth.

2. The combination of the shovel H and the frames F F, supporting the conveyer N, when constructed and arranged in such a manner as to be adjustable vertically, so as to make the shovel run at different depths, as herein specified.

3. In combination with the said shovel, the arrangement of the arms G G, cross-bar J, arm K, and lever L, to operate in the manner specified.

4. The arrangement of the apron $t$ below the conveyer and over the chute R, for the purposes specified.

5. The arrangement of the chute R with the screen Q, when used in combination with a conveyer, P, above the same, substantially as specified.

6. In combination with the conveyers N P and screen Q and its side chute, I claim the arrangement of an elevator U, so as to operate in the manner set forth.

7. The arrangement of a tipping-platform, Z, below and to the rear of the discharge of the elevator, to sustain the sack in the manner described.

8. Providing the said platform with one or more rollers, to facilitate the removal of the sacks when full, substantially as herein set forth.

HENRY P. HINZ.

Witnesses:
W. E. MARRS,
A. B. J. PARSONS.